Jan. 7, 1941.    W. D. DOOLEY    2,227,881
METHOD AND APPARATUS FOR TESTING EGGS
Filed April 1, 1938    3 Sheets-Sheet 2
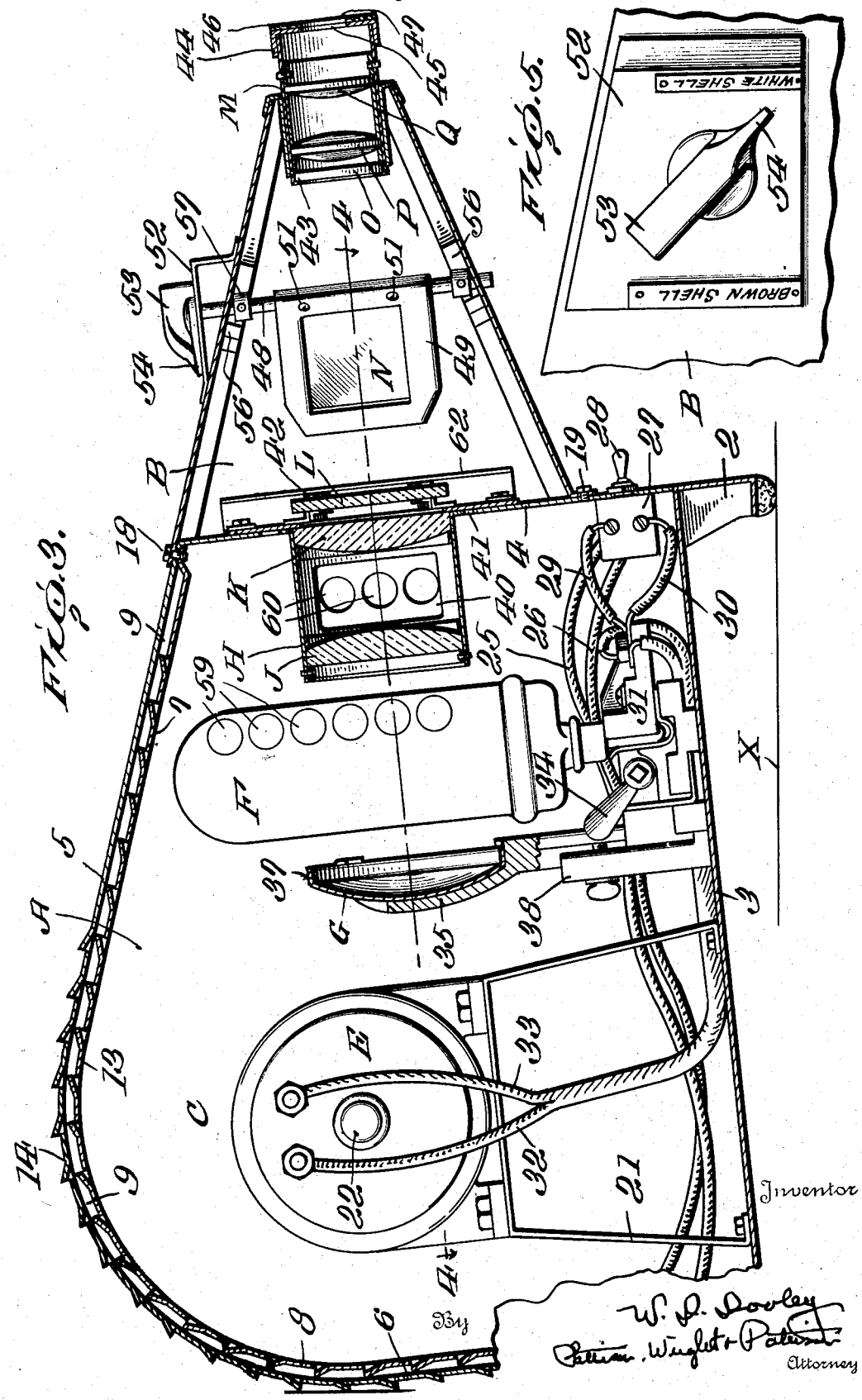

Jan. 7, 1941.  W. D. DOOLEY  2,227,881
METHOD AND APPARATUS FOR TESTING EGGS
Filed April 1, 1938  3 Sheets-Sheet 3
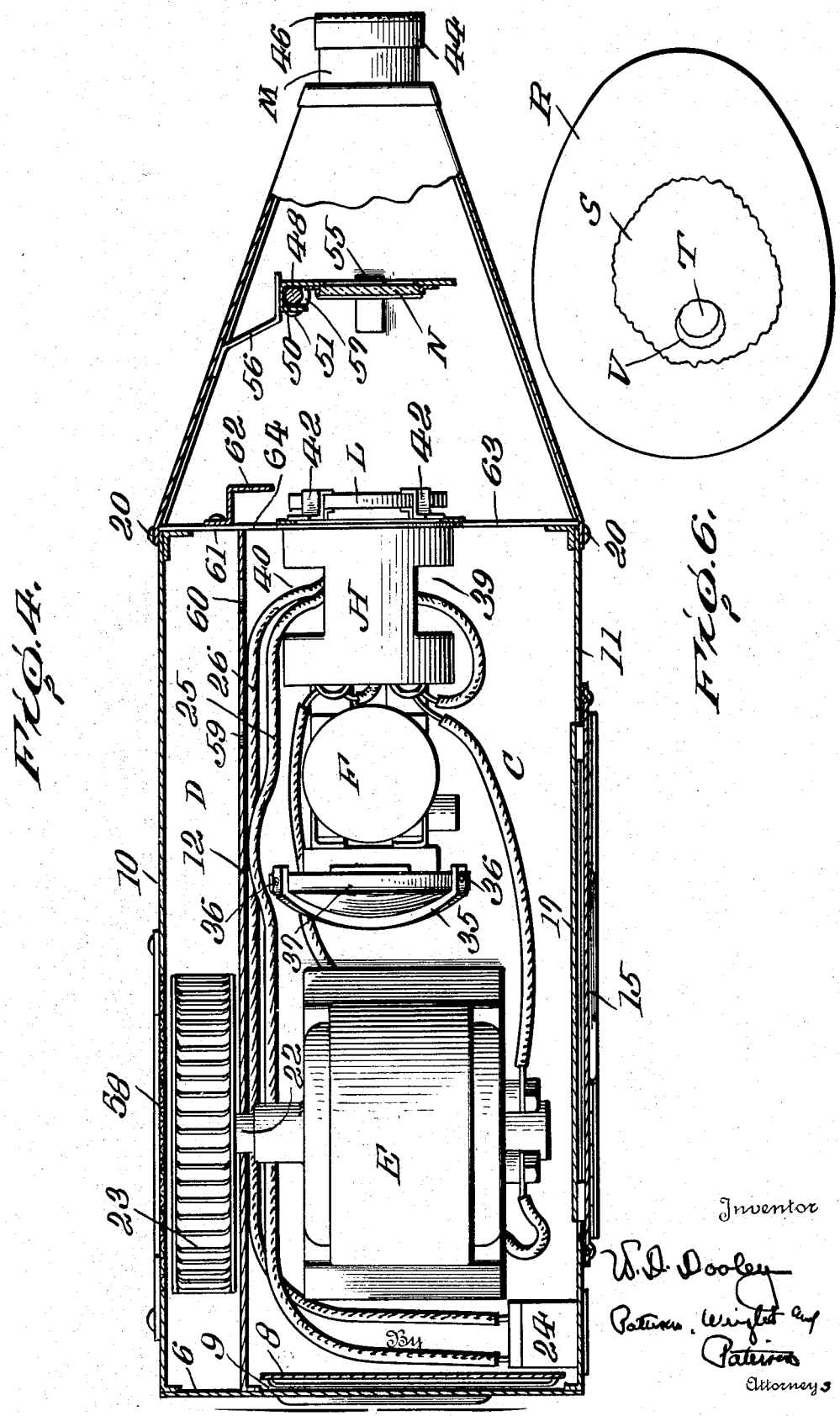

Patented Jan. 7, 1941

2,227,881

UNITED STATES PATENT OFFICE 2,227,881

METHOD AND APPARATUS FOR TESTING EGGS

William D. Dooley, Springfield, Ohio, assignor to Joseph B. Cartmell, Springfield, Ohio Application April 1, 1938, Serial No. 199,529

7 Claims. (Cl. 88—14.1)

This invention relates to a method and apparatus for testing eggs and is directed more particularly and specifically to an apparatus and method which enables the determination of the fertility or infertility of eggs rapidly and accurately.

Another object of the invention is the provision of an apparatus which is comparatively simple of construction and cheap of manufacture and highly efficient in operation for determining by the application of controlled light the fertility or infertility of eggs.

A still further object of the invention is the provision of an apparatus and method for determining visually the fertility or infertility of eggs and which operates in a manner whereby the fertility or infertility of eggs can be more accurately determined than has heretofore been possible.

Other further objects, novel features of construction and specific improvements of the present invention will appear in more detail from the following description when read in the light of the accompanying drawings.

In the drawings:

Fig. 3 is a longitudinal vertical sectional view through the machine.

Fig. 4 is a longitudinal horizontal sectional view through the machine.

Fig. 5 is a top plan view of the plate 52 upon which is carried the indicating media.

Fig. 6 is a top plan view illustrating the appearance of a fertile egg when the light of the present apparatus is projected therethrough.

Figure 1:
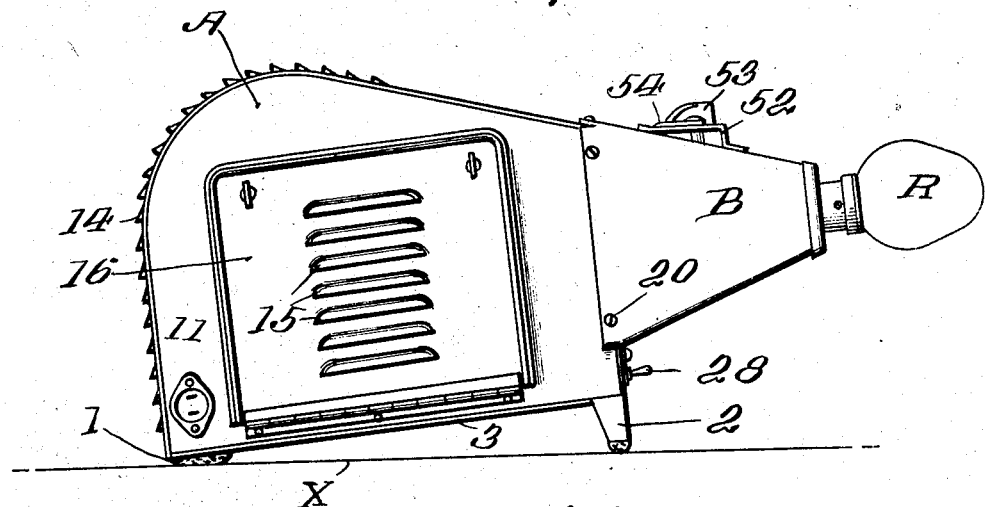
Fig. 1 is a view in side elevation of the improved machine for practicing the present improved method.
Figure 2:
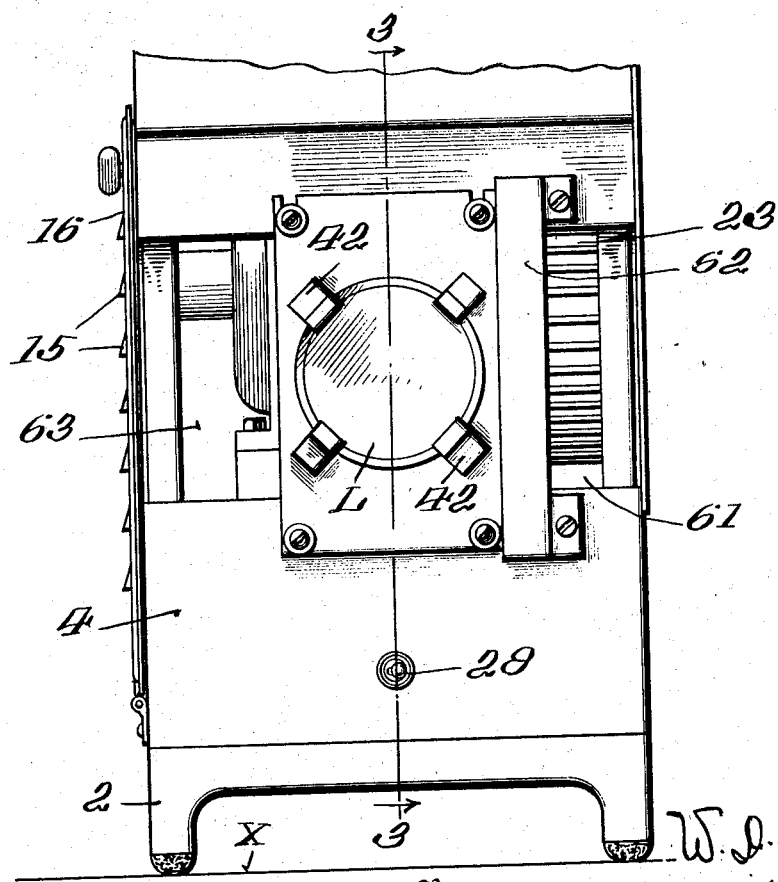
Fig. 2 is a front end view of the machine with the hood removed therefrom.

It is well known that some eggs are fertile and hatchable whereas others are not. It is further known that in the case of a fertile egg which has been subjected to an environment suitable for cell division the egg germ which is present in the yolk will show a definite growth and development and that this germ grows in a circular shape and will always orient itself on the top of the yolk and against the inner upper side of the egg shell. This growing embryo will bulge in the center so as to form on the surface of the yolk what might be well termed a blister. Biologically this growing embryo is referred to as the blastoderm.

In the case of an infertile egg there is no germ growth or cell division and there is not present in or on the egg yolk any blastoderm. In the infertile egg there is a single female cell which with heat may change its appearance and size but which does not have the appearance of a fertile egg in which the unions between the male and female germ cells have increased in numbers due to the process of incubation or eggs which have been held at a temperature sufficient to provide the correct environment for cell division.

The yolk of an egg will, as stated, orient itself against the inner side of the shell at the top of the egg. If an egg is held with its long axis approximately horizontal the yolk will assume a position immediately beneath the shell at the top of the egg, and if the egg is then rotated on its axis the yolk will, shortly after said rotation is stopped, orient itself to the same position beneath the top of the egg shell as it had prior to the rotative movement. If the egg be tilted in respect to its axis the yolk will move forwardly and backwardly at the top of the egg in accordance with the particular inclination given to the egg. At all times after the yolk has oriented itself the blastoderm or blister will be at the top of the egg yolk and immediately beneath the shell at the top of the egg.

Having the above facts in mind, the present apparatus and method has been conceived by which through the application of controlled light to eggs the presence or absence of the blastoderm, germ or blister on the egg yolks can be visually determined.

Having reference now to the drawings in which is illustrated an apparatus suitable for practicing the present improved method and in which similar reference designations are used to designate similar parts throughout the description, A designates a housing with the front end of which is associated a hood B which is illustrated as being detachably associated with the main housing but forming a continuation thereof. The main housing at its rear end is provided with suitable short legs 1 and at its front end with longer legs 2 so that when positioned upon a base the housing is at an inclination to the horizontal. This inclination of the device is preferable but not essential.

The main housing comprises a bottom 3, a front wall 4 and a single piece which is bent to form an outer top wall 5 and rear wall 6. A similar piece is bent to form inner top and rear walls 7 and 8 disposed in spaced parallel relationship to the outer top and rear walls to form an air space 9. One side wall of the housing is designated at 10 and the other at 11. A longitudinally extending inner wall 12 divides the housing into a main chamber C and a supplemental fan and air duct chamber D. By reference to Fig. 4 of the drawings it will be seen that the inner top and rear walls 7 and 8 extend only over the main chamber C and by reason of the louver openings 13 and 14 in the walls 5, 6, 7 and 8 communication to atmosphere is provided for the chamber C. Additional communication with atmosphere for the main chamber C is provided through louvres 15 provided in the swinging door 16 at the side 11 of the housing. This door at its inner side is provided with a liner plate 17 disposed in separated parallel relationship to the inner face of the door.

The hood B has an open rear end and the rear edges of its walls are suitably secured as at 18, 19 and 20 to the front end 4 of the main housing.

An electric motor E is disposed in the rear end of the main housing main chamber C and is supported in elevated relationship to the bottom of the housing upon a suitable bracket support 21. The shaft 22 of this motor extends into the fan chamber and carries therein a suitable fan 23.

A heterochromatic light source is provided in the form of a special electric light F of great intensity and of high durability as to life.

Electric current for the motor and light is brought from any convenient source of supply to a socket 24 positioned in the side wall 11 of the housing. From the socket the current is carried by suitable wires 25 and 26 to a switch box 27 within the front end of the housing and which is operable by an externally positioned switch handle 28. From the switch box current is delivered through wires 29 and 30 to the socket or light base 31 and by wires 32 and 33 to the electric motor. Thus by manipulation of the switch handle 28 current is simultaneously delivered to or cut-off from the light and electric motor. The lamp socket is provided with a clamp operating handle 34 through the manipulation of which it is possible to release the lamp for removal or replacement through the door 16 of the housing.

A reflector G is positioned behind the lamp and is adjustably mounted within a bracket 35 through the instrumentality of suitable screws 36 or the like which frictionally engage the rim 37 of the reflector. The reflector carrying bracket 35 is supported on a standard 38 and is adjustable both vertically and in respect to a vertical plane.

A carrier H preferably of cylindrical form is notched out as at 39 and 40 intermediate its length and is supported on the front wall 4 of the main housing within an opening 41 therein. In the rear end of this carrier and adjacent the light source there is positioned a condenser J made of flint glass and at the other end of the carrier and adjacent the opening 41 in the housing front wall there is positioned a second condenser K made of Jena glass. These condensers are specially designed and constructed plano convex lenses of very short focal length and constitute achromatic lenses which are anastigmatically and chromatically corrected.

Beyond the outer condenser lens K and within the hood B and supported upon the outer face of the main housing front wall 4 by suitable brackets 42 or the like there is positioned a heat absorbing or absorption glass L the properties of which are such that it will absorb 70 to 85% of the heat present in the concentrated beam of light traveling from the reflector through the condenser lenses J and K. This heat absorption lens is color corrected so that its absorption of light is at a minimum and will amount only to from three to seven percent. Its color is such that it passes 95 to 98% of all the wave lengths from 550 mu down to 370 mu that are generated by the light source F without either loss or absorption.

A carrier M is positioned in the outer end of the hood B in optical alignment with the aforementioned lenses J and K and reflector G. This carrier has its rear end 43 extending within the hood while its outer end extends beyond the front end of the hood and is provided with a cap 44 having an opening 45 therein. A soft pad-like member 46 having an opening 47 registering with the aforementioned opening 45 is carried on the outer face of the cap as a protection to eggs being tested.

A vertically disposed and rotatably mounted shaft 48 extends through the hood at a point intermediate the heat absorption lens L and the inner end 43 of the carrier M. A filter N is suitably secured within a frame 49 one end of which is bent around the shaft 48 as indicated at 50 and secured thereto as at 51. This filter N is of such a color and so optically ground as to give it the physical property of absorbing all of the wave lengths transmitted by the light source F with the exception of those having a frequency or wave length between 480 mu and 520 mu. Of these particular wave lengths this filter will transmit upwards of 85% of those transmitted by the light source. The shaft 48 extends outwardly beyond the top of the hood and through a plate 52 above which it carries an operating handle 53. By means of the operating handle the filter can be swung into the position illustrated in Fig. 4 of the drawings so that light beam passing from the light source will pass through the filter or it can be swung back against the inner side wall of the hood and completely out of the light beam. On the plate 52 there is indicating media to designate the position of the filter N. The shaft operating handle 53 has a pointer-like end 54 which cooperates with the designating media on the plate. To assure proper positioning of the filter when it is swung into the light beam a stop 55 is provided against which the bottom of the filter frame 49 will abut. 56 are spring arms which bear against the enlargements 57 carried adjacent the upper and lower ends of the shaft within the hood and will bear with sufficient friction against the shaft as to cause it to remain in its set positions.

Within and adjacent the inner end of the carrier or lens tube M there is positioned another filter O. This filter is permanently positioned and is capable of cutting off the light spectrum very sharply. This filter is so colored and optically ground that it has the physical property of absorbing all the wave lengths or frequencies transmitted by the light source F except those having a wave length or frequency between 480 mu and 540 mu. Of the wave lengths within this particular range the filter will transmit 75 to 80% of those generated or transmitted by the light source F.

When the filter N is swung into the light beam and into optical alignment with the filter O and these filters are used conjointly they will absorb all of the wave lengths or frequencies generated or transmitted by the light source F with the exception of those lying between 480 mu and 520 mu and of these particular wave lengths they will pass 75 to 80% of those generated or transmitted by the light source.

Also mounted within the lens tube M beyond the filter O there is positioned an anastigmatically and chromatically corrected convex lens P of very short focal length. Beyond the lens P and adjacent the outer end of the tube there is positioned another anastigmatically and chromatically corrected plano convex lens Q which is also of very short focal length.

In Fig. 1 of the drawings an egg R is illustrated in the position it is caused to assume when it is desired to determine whether or not it is fertile or infertile. In viewing the egg the operator looks down upon the top of the egg and inasmuch as the yolk of the egg will be either a light yellow or dark yellow or a light red or a darker red and by reason of the fact that all of the wave lengths transmitting red, yellow and purple have been eliminated from the light projected into the egg, its fertility or infertility is readily visibly determinable for the reasons hereinbefore set forth.

In Fig. 6 there is illustrated the appearance a fertile egg has when viewed in connection with the present apparatus. The egg is designated at R, the shadow of the yolk is indicated at S, the germ or blastoderm at T and the white halo at V.

In the operation of the present apparatus and the carrying out of the present method the eyes of the operators after several hours will naturally become fatigued. The purpose of providing the two filters N and O with the use of the filter N being optional, is to prevent as far as possible this eye fatigue. White shelled eggs will admit the passage of more light than will brown shelled eggs whose index of refraction is much less than that of the white shelled eggs. As a consequence if it were not for the provision of the movable filter N the light intensity within the eggs would vary in accordance with the nature of their shells. When a human has been looking at a bright light source and then changes to a light source of less intensity the pupil of the eye must dilate and contract almost instantly. If the eyes of the operators were subjected to this condition their eyes would become tired and their ability to differentiate between a fertile and a sterile egg would be greatly impaired. By the use of the filter N on white shelled eggs and its elimination on brown shelled eggs the volume of light transmitted to the interior of the egg will be to all intent and purposes by meter measurement practically identical which will overcome to a very material degree eye fatigue to the operators.

Thus it will be seen that when the filter N is used in conjunction with the filter O the intensity of the light projected into the white shelled egg is decreased. When both of the filters are used as on the white shelled eggs the light is sea-green in color and when only the single filter is used as on brown shelled eggs the light projected into the egg is sea-blue in color.

In respect to the optical train comprising the condensers J and K, and the lenses P and Q their construction and arrangement is such that instead of focusing the image of the filament of the lamp F at the sharpest point of focus of the lens Q as is the usual practice in stereopticon and other similar projecting devices the face of the condenser K is focused inside of the egg at approximately the center of the yolk. This means that the focal point is beyond the opening 45 of the lens tube M a distance approximately where the center of the yolk of an egg would be when the large end of an egg is inserted into the opening 45. By focusing the face of the condenser K within the egg as stated the shadow of the filament of the light F is entirely eliminated as this will come to focus from 3½ to 4 inches in front of the point at which the egg is visually viewed.

It is to be understood that in viewing the egg it is held with its long axis in approximately a horizontal plane with the large end of the egg inserted into the opening 45 at the outer end of the lens tube M. The light of the particular wave lengths hereinbefore referred to is projected into the egg in the manner described and I have found that the chemical constituents of all eggs are such that reflection takes place at right angles to the concentrated light beam entering the egg. When viewing white shelled eggs both of the filters N and O are used but when viewing brown shelled eggs the filter N is swung out of the light beam into an inoperative position.

All of those wave lengths of light are eliminated by the filters except those of a color which will accentuate the color of the egg yolk with the result that the yolk when viewed is a dark shadow and that the size of the germ, blastoderm or blister, if the same be present in the yolk, is readily visible. The determination of the presence of the germ is further simplified by reason of the fact that a white halo will be created around the germ. The yolk will appear as a shadow and the germ as a darker shadow with a white halo around it, see Fig. 6 of the drawings.

The reflector G is, as stated, a metallic reflector and is used in place of the usual glass reflector for the reason that glass reflectors absorb the long light waves present in the ordinary heterochromatic light source. Additionally glass reflectors with silvered backs when exposed to an intense heat such as is present in the present device deteriorate. This is particularly true when the reflector is subjected to the heat for long periods as it has been found that the silvered deposit on the back surface of the reflector will break. It has further been found that a glass reflector subjected to such heat as is here present will expand in a manner to cause distortion of the reflected image of the light filament with a consequent loss of light in direct proportion to the percentage of distortion which under tests has been found to be as high as 30 to 50%. These disadvantages of a glass reflector are overcome by the present particular metallic reflector upon which rhodium is first electrolytically deposited to a depth or thickness of one and one-half to three one-thousandths of an inch and upon which is then electrolytically deposited copper and nickel to a thickness of one-quarter to three-eights of an inch. The reflector is provided peripherally with the hereinbefore referred to rim 37 which, when the reflector is subjected to heat, will cause expansion of the reflector in a uniform circle or sphere and thus prevent expansion in an elliptical or oblique plane as is true in respect to glass reflectors and which causes the undesirable distortion hereinbefore referred to. The metallic reflector will not lose its reflecting properties either by reason of age or heat.

It is of course understood that the very strong electric lamp or tube F will generate a high degree of heat and that the light filters will become heated as they will be absorbing 90% of all light waves in the infrared. The heat absorption lens L will of course become heated.

The fan and air duct arrangement however is such as to cool these members and to cool the interior of the mechanism. When the apparatus is in operation the fan 23 will draw air into the air duct D through the mesh covered opening 58 in the wall 10 of the main housing A. This air will circulate through the openings 59 against the lamp F and the openings 60 which are in alignment with the notched-out portions 39 and 40 of the lens carrier H and will pass through the lens carrier and cool the lenses J and K. This air which enters the main chamber C of the main housing will pass outwardly through the louvers in the top and back walls of the housing and through the louvers in the door 16 thereof. The air traveling in the air duct D will also pass through its open front end 61 where it will strike the deflector 62 which will cause it to pass over the heat absorption lens L and this air will circulate within the housing hood B before moving through the openings 63 and 64 into the main housing chamber C for escape to atmosphere.

From the foregoing it will be seen that there is provided a highly efficient apparatus for visually determining the fertility or infertility of eggs and that the apparatus is one which is comparatively cheap and simple to manufacture and capable of being efficiently used in the hands of even unskilled operators. It will be further seen that any guess-work or inaccuracy in the determination of the fertility or infertility of an egg has been obviated and that the users of the method and apparatus can rapidly and accurately visually select fertile eggs for incubation. To those having knowledge of this art the great saving effected by being able to incubate only fertile eggs is obvious.

It is to be understood that the present invention is not limited to the use of a light source which generates heat to such an extent as to require mechanical cooling means nor to a heterochromatic source of light or a filament type of light exclusively inasmuch as any suitable light source may be used which will generate light having the desired or usable wave lengths.

I claim:

1. The method of visually determining the fertility of an egg which has been subjected to incubation to a degree where the blastoderm, if present, becomes visible to the eye when viewed in the manner and under the conditions hereinafter defined, comprising the steps of, providing a filament type of light source and projecting therefrom and through the egg along the long axis thereof and while the egg is in substantially a horizontal plane in respect to said axis, a beam of light the wave lengths of which are all between 480 mu and 540 mu, focusing said beam at approximately the middle of the yolk of the egg, focusing the shadow of said light filament at a point in front of and exterior of the egg, and viewing the egg from above and substantially at right angles to said light beam.

2. An apparatus for visually determining the fertility of either a white or brown shelled egg comprising, a housing having a light source therein and a light outlet opening against which an egg is adapted to be held, means within said housing to project a beam of light through said housing opening and an egg held thereagainst, a fixed light filter disposed in said light beam and having the characteristic of passing only light waves the lengths of which are all between 480 mu and 540 mu, a shaft rotatably supported in said housing and provided with an operating handle external of the housing, a filter carried by said shaft and rotatable thereby into and out of said light beam, said movable filter having the characteristic of passing in combination with said first named filter only those wave lengths of light which lie between 480 and 520 mu.

3. An apparatus for visually selecting fertile eggs, comprising a housing having therein an electric filament type lamp, an aperture in said housing against which one end of an egg is adapted to be held with its longitudinal axis disposed in substantially a horizontal plane, means to project a beam of light from said lamp through said aperture and the egg held thereagainst, means for focusing said light beam at approximately the middle of the yolk of an egg held against said light aperture, means to focus the shadow of the filament of said light at a point in front of and exterior of an egg held against said light aperture, a fixed light filter in said light beam and within said housing, a vertically disposed shaft rotatably mounted within said housing and having means exterior of the housing by which it may be rotated, a second light filter carried by said shaft and movable thereby into and out of said light beam, said pair of filters being characterized in their conjoint use so they will permit the passage of only those light rays having a length between 480 and 520 mu for use in determining the fertility of a brown shelled egg, and said fixed light filter being characterized that when used alone it will permit the passage of only those light rays having a length between 480 and 540 mu for use in determining the fertility of white shelled eggs.

4. A structure such as defined in claim 3 wherein resilient means disposed within said housing has operative engagement with said vertical shaft for holding the same against other than intentional movement from a position where the movable filter is disposed in said light beam or from a position where said movable filter is disposed outside said light beam.

5. An apparatus for visually selecting fertile from infertile eggs comprising, a main housing and a supplemental housing at one side thereof, a high-powered filament type electric light in said main housing, an aperture in said supplemental housing, a tubular carrier supported in said aperture and provided at its outer end with an opening against which one end of an egg is adapted to be held with its longitudinal axis disposed in substantially a horizontal plane, an aperture providing communication between the main and supplemental housings and disposed in alignment with the aperture of said supplemental housing and said egg receiving opening, a tubular carrier within the main housing adjacent the aperture providing communication between the two housings, a pair of lenses mounted in said carrier, a heat absorption glass in the supplemental housing and disposed across the aperture which provides communication between the two housings, a pair of lenses in the aforementioned carrier which is provided with the egg receiving opening, a light filter also mounted in said carrier, said filter characterized by permitting the passage through it of only light rays having a length between 480 and 540 mu, a second light filter disposed in the supplemental housing intermediate the two lens carriers, a reflector for projecting a light beam from said light source through the lenses of the carrier within the main housing and the filter and lenses mounted within the carrier located in the supplemental housing aperture, said second filter being supported whereby it is movable into and out of said light beam, means exterior of the housing for conveniently moving said second light filter, said second light filter being characterized that when interposed in the light beam the light rays permitted to pass through the egg receiving opening all lie between 480 and 520 mu, an air chamber at one side of said main housing and provided with an air inlet opening, a power driven fan within said air chamber, direct communication between said air chamber and said supplemental housing, communication between said supplemental housing and said main housing to permit air to circulate from said supplemental into said main housing, air outlets from said main housing to the surrounding atmosphere, a baffle plate disposed in said supplemental housing and acting to direct a portion of the air directed into said supplemental housing from said air chamber against said heat absorption lens, said lens carrier within said main housing being constructed to permit the passage of air through the space between said lenses, air inlet openings between said main housing and said air chamber and positioned to direct air through the space between said lenses, and additional air inlet openings between said main housing and said air chamber and positioned to direct air against said light.

6. An apparatus for visually selecting fertile eggs, comprising a main housing with an air chamber at one side thereof, a power driven fan in said air chamber, an air inlet into said air chamber, a supplemental housing forming a continuation of said main housing and having communication at one side with said air chamber and at its other side with said main housing, a light passage aperture between said main and supplemental housings, a carrier in the main housing within which a pair of lenses is disposed in separated relationship, said carrier intermediate said lenses being provided with a transverse passageway, a high-powered filament type electric light in said main housing, a reflector behind said light and adapted to project a light beam from said light towards said light aperture, said lens carrier being positioned to interpose said lenses in said light beam in its passage through said aperture, said supplemental housing in its end remote from said main housing provided with an aperture in horizontal alignment with the light aperture between said main and supplemental housings, a second carrier disposed in said light aperture in the end of said supplemental housing and provided in its outer end with an opening adapted to receive one end of an egg held with its longitudinal axis disposed in substantially a horizontal plane, a pair of lenses in said carrier, a light filter in said carrier, a vertically disposed and rotatably supported shaft in said supplemental housing intermediate its ends and provided exteriorly of the housing with an operating handle, said shaft being disposed in a vertical plane at one side of said light beam, a light filter mounted on said shaft and rotatable therewith into a position where said light beam must pass through it on its way to the egg receiving opening of the supplemental housing lens and light filter carrier or to a position where it lies wholly outside of said light beam, said light filters being characterized in their conjoint use by permitting the passage of only those light rays having a length between 480 and 520 mu, said fixed light filter being characterized by passing only those light rays having a length between 480 and 540 mu, air passageways between said air chamber and said main housing disposed to direct a current of air through the transverse passageway of the lens carrier in the main housing, additional air passageways between the air chamber and the main housing positioned to direct a current of air against said light, and air outlet openings in the main housing communicating with the atmosphere, whereby air is forced by said fan into the main and supplemental housings and circulates through said housings and escapes therefrom through said main housing air outlet openings.

7. A construction such as defined in claim 6, wherein there is a heat absorption lens disposed in said supplemental housing and in the light beam passing therethrough, a baffle in said supplemental housing and positioned to direct a portion of the air stream moving from said air chamber into said supplemental housing against and over said heat absorption lens.

WILLIAM D. DOOLEY.